US010540876B2

(12) United States Patent
Johnson et al.

(10) Patent No.: US 10,540,876 B2
(45) Date of Patent: *Jan. 21, 2020

(54) SURVEILLANCE SYSTEM AND METHOD FOR PREDICTING PATIENT FALLS USING MOTION FEATURE PATTERNS

(71) Applicant: CareView Communications, Inc., Lewisville, TX (US)

(72) Inventors: Steven Gail Johnson, Highland Village, TX (US); Derek del Carpio, Corinth, TX (US)

(73) Assignee: CareView Communications, Inc., Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,485

(22) Filed: Mar. 14, 2019

(65) Prior Publication Data

US 2019/0318601 A1   Oct. 17, 2019

Related U.S. Application Data

(63) Continuation of application No. 16/043,965, filed on Jul. 24, 2018, now Pat. No. 10,276,019, which is a (Continued)

(51) Int. Cl.
*G08B 21/04* (2006.01)
*G06T 7/246* (2017.01)
(Continued)

(52) U.S. Cl.
CPC ....... *G08B 21/043* (2013.01); *G06K 9/00771* (2013.01); *G06K 9/66* (2013.01);
(Continued)

(58) Field of Classification Search
CPC .. G08B 21/043; G08B 21/0476; G06T 7/248; G06K 9/00771; G06K 9/66
See application file for complete search history.

(56) References Cited

U.S. PATENT DOCUMENTS 8,620,625 B2 * 12/2013 Sing ...................... A61B 5/1116
250/559.39
8,907,287 B2 * 12/2014 Vanderpohl .......... A61B 5/0077
250/349

(Continued)

*Primary Examiner* — Kim Y Vu
*Assistant Examiner* — Molly Delaney
(74) *Attorney, Agent, or Firm* — Meister Seelig & Fein LLP; Seth H. Ostrow, Esq.

(57) ABSTRACT

A method and system for detecting a fall risk condition, the system comprising a surveillance camera configured to generate a plurality of frames showing an area in which a patient at risk of falling is being monitored, and a computer system comprising memory and logic circuitry configured to store motion feature patterns that are extracted from video recordings, the motion feature patterns are representative of motion associated with real alarm cases and false-alarm cases of fall events, receive a fall alert from a classifier, determine motion features of one or more frames from the plurality of frames that correspond to the fall alert; compare the motion features of the one or more frames with the motion feature patterns, and determine whether to confirm the fall alert based on the comparison.

20 Claims, 10 Drawing Sheets

Related U.S. Application Data continuation of application No. 15/824,552, filed on Nov. 28, 2017, now Pat. No. 10,055,961.

(60) Provisional application No. 62/530,380, filed on Jul. 10, 2017.

(51) Int. Cl.
  *G06K 9/00* (2006.01)
  *G06K 9/66* (2006.01)
  *G08B 29/18* (2006.01)

(52) U.S. Cl.
  CPC .......... *G06T 7/248* (2017.01); *G08B 21/0476* (2013.01); *G08B 29/186* (2013.01); *G06T 2207/10016* (2013.01); *G06T 2207/30196* (2013.01); *G06T 2207/30232* (2013.01)

(56) References Cited

U.S. PATENT DOCUMENTS

| | | | | |
|---|---|---|---|---|
| 9,524,632 | B2* | 12/2016 | Moore | G08B 21/245 |
| 9,597,016 | B2* | 3/2017 | Stone | A61B 5/004 |
| 10,055,961 | B1* | 8/2018 | Johnson | G08B 29/186 |
| 10,276,019 | B2* | 4/2019 | Johnson | G08B 29/186 |
| 2003/0058111 | A1* | 3/2003 | Lee | G06K 9/00342 |
| | | | | 340/573.1 |
| 2003/0058341 | A1* | 3/2003 | Brodsky | G06K 9/00335 |
| | | | | 348/169 |
| 2012/0138801 | A1* | 6/2012 | Vanderpohl | A61B 5/0077 |
| | | | | 250/349 |
| 2016/0377704 | A1* | 12/2016 | Harash | G01S 7/411 |
| | | | | 342/21 |
| 2017/0061763 | A1* | 3/2017 | Hanson | A61B 5/0077 |
| 2017/0155877 | A1* | 6/2017 | Johnson | H04N 7/183 |
| 2017/0352240 | A1* | 12/2017 | Carlton-Foss | A61B 5/1117 |

* cited by examiner

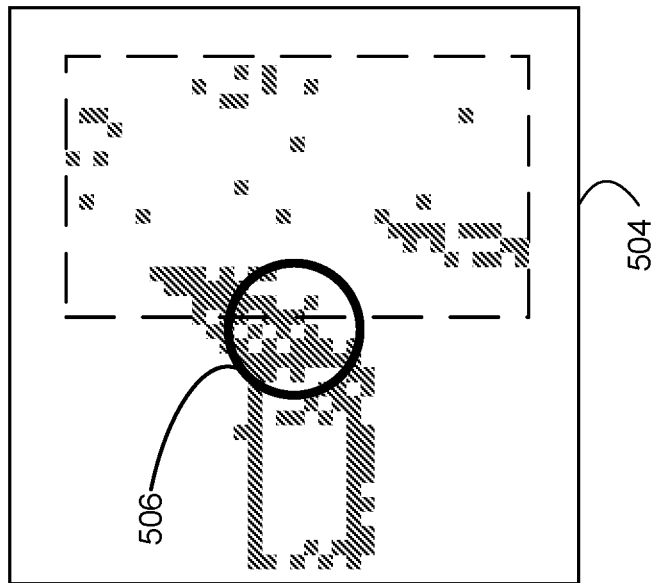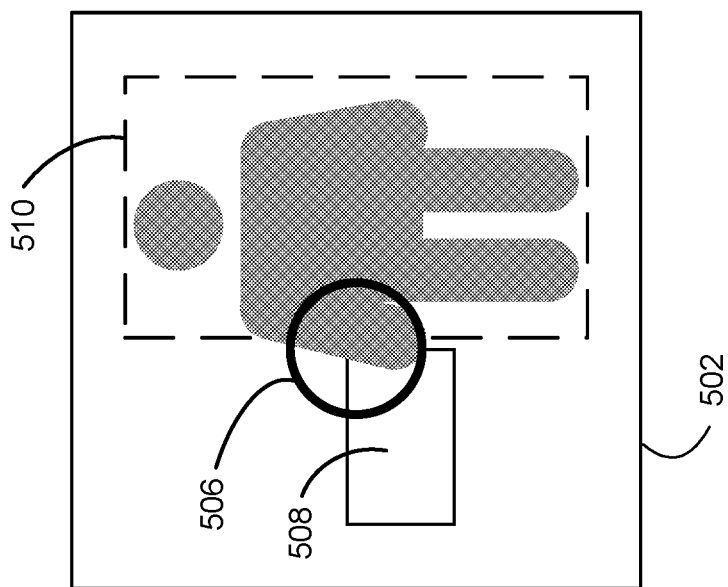
FIG. 5

SURVEILLANCE SYSTEM AND METHOD FOR PREDICTING PATIENT FALLS USING MOTION FEATURE PATTERNS

CROSS-REFERENCE TO RELATED APPLICATIONS

The present application is a continuation of U.S. patent application Ser. No. 15/824,552, entitled "SURVEILLANCE SYSTEM AND METHOD FOR PREDICTING PATIENT FALLS USING MOTION FEATURE PATTERNS," filed on Nov. 28, 2017, which claims the priority of U.S. Provisional Application No. 62/530,380, entitled "System and Method for Predicting Patient Falls," filed on Jul. 10, 2017.

The present application is related to the following patents and applications, which are assigned to the assignee of the present invention:

U.S. Pat. No. 7,477,285, filed Dec. 12, 2003, entitled "Non-intrusive Data Transmission Network for Use in an Enterprise Facility and Method for Implementing,"

U.S. Pat. No. 7,987,069, filed Nov. 11, 2008, entitled "Monitoring Patient Support Exiting and Initiating Response,"

U.S. Pat. No. 8,471,899, filed Oct. 27, 2009, entitled "System and Method for Documenting Patient Procedures,"

U.S. Pat. No. 8,675,059, filed Jul. 29, 2010, entitled "System and Method for Using a Video Monitoring System to Prevent and Manage Decubitus Ulcers in Patients,"

U.S. Pat. No. 8,676,603, filed Jun. 21, 2013, entitled "System and Method for Documenting Patient Procedures,"

U.S. Pat. No. 9,041,810, filed Jul. 1, 2014, entitled "System and Method for Predicting Patient Falls,"

U.S. Pat. No. 9,311,540, filed May 6, 2008, entitled "System and Method for Predicting Patient Falls,"

U.S. Pat. No. 9,318,012, filed Mar. 23, 2012, entitled "Noise Correcting Patient Fall Risk State System and Method for Predicting Patient Falls,"

U.S. Pat. No. 9,579,047, filed Mar. 14, 2014, entitled "Systems and Methods for Dynamically Identifying a Patient Support Surface and Patient Monitoring,"

U.S. Pat. No. 9,635,320, filed May 12, 2015, entitled "Electronic Patient Sitter Management System and Method for Implementing,"

U.S. application Ser. No. 14/039,931, filed Sep. 27, 2013, entitled "System and Method for Monitoring a Fall State of a Patient While Minimizing False Alarms,"

U.S. application Ser. No. 13/714,587, filed Dec. 14, 2012, entitled "Electronic Patient Sitter Management System and Method for Implementing,"

U.S. application Ser. No. 14/158,016, filed Jan. 17, 2014, entitled "Patient Video Monitoring Systems and Methods having Detection Algorithm Recovery from Changes in Illumination," and U.S. application Ser. No. 15/364,872, entitled "System and Method for Predicting Patient Falls," filed on Nov. 30, 2016.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

The above identified patents and applications are incorporated by reference herein in their entirety.

BACKGROUND OF THE INVENTION

The invention described herein generally relates to a patient monitor, and in particular, a system, method and software program product for analyzing video frames of a patient and determining from motion within the frame if the patient is at risk of a fall.

Fall reduction has become a major focus of all healthcare facilities, including those catering to permanent residents. Healthcare facilities invest a huge amount of their resources in falls management programs and assessing the risk of falls in a particular patient class, location, and care state, along with the risk factors associated with significant injuries. Round the clock patient monitoring by a staff nurse is expensive, therefore, healthcare facilities have investigated alternatives in order to reduce the monitoring staff, while increasing patient safety. Healthcare facilities rely on patient monitoring to supplement interventions and reduce the instances of patient falls.

Many patient rooms now contain video surveillance equipment for monitoring and recording activity in a patient's room. Typically, these video systems compare one video frame with a preceding frame for changes in the video frames that exceed a certain threshold level. More advanced systems identify particular zones within the patient room that are associated with a potential hazard for the patient. Then, sequential video frames are evaluated for changes in those zones. Various systems and methods for patient video monitoring have been disclosed in commonly owned U.S. Patent Application Nos. 2009/0278934 entitled System and Method for Predicting Patient Falls, 2010/0134609 entitled System and Method for Documenting Patient Procedures, and 2012/0026308 entitled System and Method for Using a Video Monitoring System to Prevent and Manage Decubitus Ulcers in Patients, each of which is incorporated herein by reference in its entirety.

Such automated systems may be susceptible to false-alarms, which can burden a staff of healthcare professionals with unnecessary interventions. For example, a false-alarm can be triggered by patient activity that is not indeed indicative of an increased risk of a patient fall. A false-alarm can also be triggered by the activity of a visitor (e.g., healthcare professional, family of patient) around the patient. While the aforementioned systems is capable of detecting potential falls using image processing techniques, there currently exists opportunities to improve the accuracy of such systems to reduce the number of false positives detected by such systems.

The inventions disclosed herein improve upon the previously discussed systems for identifying and analyzing video frames to detect potential falls by employing supervised learning techniques to improve the accuracy of fall detection given a plurality of video frames. Specifically, the present disclosure discusses techniques for analyzing a set of key features that indicate when a fall is about to occur. By identifying key features, the present disclosure may utilize a number of supervised learning approaches to more accurately predict the fall risk of future video frames.

Embodiments of invention disclosed herein provide numerous advantages over existing techniques of analyzing image frame data to detect falls. As an initial improvement, the use of multiple image frames corrects training data to remove noise appearing due to changes in lighting. During testing, the use of a classifier, versus more simplistic comparison, yield at an accuracy level of approximately 92%. Thus, the embodiments of the disclosed invention offer significantly improved performance over existing techniques in standard conditions, while maintaining a consistent increase in performance in sub-optimal conditions (e.g., dim or no lighting).

SUMMARY OF THE INVENTION

The present invention provides a method and system for detecting a fall risk condition. The system comprises a surveillance camera configured to generate a plurality of frames showing an area in which a patient at risk of falling is being monitored, and a computer system comprising memory and logic circuitry configured to store motion feature patterns that are extracted from video recordings, the motion feature patterns are representative of motion associated with real alarm cases and false-alarm cases of fall events, receive a fall alert from a classifier, the fall alert associated with the plurality of frames generated by the surveillance camera, determine motion features of one or more frames from the plurality of frames that correspond to the fall alert; compare the motion features of the one or more frames with the motion feature patterns, and determine whether to confirm the fall alert based on the comparison.

According to one embodiment, configuring the computer system to store the motion feature patterns further comprises the computer system configured to identify the real alarm cases or false-alarm cases of fall events from the video recordings. In another embodiment, configuring the computer system to compare the motion features with the motion feature patterns further includes the computer system configured to determine statistically significant similarities between motion features of the fall alert and the stored motion feature patterns. Configuring the computer system to determine motion features of the one or more frames may further comprise the computer system configured to detect motion of pixels by comparing pixels of a current frame with at least one previous frame and mark pixels that have changed as a motion pixel in a given motion image.

The computer system may be further configured to identify the real alarm cases and false-alarm cases of fall events from the plurality of frames, and determine the motion feature patterns, wherein the motion feature patterns are selected from the group consisting of a centroid, centroid area, connected components ratio, bed motion percentage, and unconnected motion. The centroid may be located by further configuring the computer system to compute weighted average x and y coordinates of motion pixels in a given motion image. In one embodiment, the bed motion percentage is a ratio of motion pixels from a given motion image within the virtual bed zone to a total pixel count in the virtual bed zone. Configuring the computer system to determine the motion feature patterns may further comprise configuring the computer system to group motion pixels that are connected in a given motion image into clusters and prune away motion pixels from the given motion image that don't have at least one pixel within a threshold distance of the virtual bed zone. A further embodiment includes the computer system configured to determine the connected components ratio based on a ratio of motion pixels outside the virtual bed zone to motion pixels inside the virtual bed zone. In yet another embodiment, the computer system is further configured to determine the unconnected motion by calculating an amount of motion pixels in the area of the centroid that is unrelated to connected motion pixels within and near the virtual bed zone.

The method comprises storing motion feature patterns that are extracted from video recordings, the motion feature patterns are representative of motion associated with real alarm cases and false-alarm cases of fall events. The method further comprises receiving a fall alert from a classifier, the fall alert associated with the plurality of frames generated by the surveillance camera, determining motion features of one or more frames from the plurality of frames that correspond to the fall alert, comparing the motion features of the one or more frames with the motion feature patterns, and determining whether to confirm the fall alert based on the comparison.

According to one embodiment, storing the motion feature patterns further comprises identifying the real alarm cases or false-alarm cases of fall events from the video recordings. Comparing the motion features with the motion feature patterns may further comprise determining statistically significant similarities between motion features of the fall alert and the stored motion feature patterns. Determining motion features of the one or more frames may further comprise detecting motion of pixels by comparing pixels of a current frame with at least one previous frame and marking pixels that have changed as a motion pixel in a given motion image.

In one embodiment, the method may further comprise identifying real alarm cases and false-alarm cases from the plurality of frames, and determining motion feature patterns associated with the real alarm cases and false-alarm cases, the features including a centroid, centroid area, a connected components ratio, bed motion percentage, and unconnected motion, storing the motion feature patterns. The centroid may be located by computing weighted average x and y coordinates of motion pixels in a given motion image. The bed motion percentage may be determined as a ratio of motion pixels from a given motion image within the virtual bed zone to a total pixel count in the virtual bed zone. In one embodiment, determining the motion feature patterns may further comprise grouping motion pixels that are connected in a given motion image into clusters and pruning away motion pixels from the given motion image that don't have at least one pixel within a threshold distance of the virtual bed zone. The connected components ratio may be determined based on a ratio of motion pixels outside the virtual bed zone to motion pixels inside the virtual bed zone. According to another embodiment, the method further comprises determining the unconnected motion by calculating an amount of motion pixels in the area of the centroid that is unrelated to connected motion pixels within and near the virtual bed zone.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 5 illustrates an exemplary centroid location according to an embodiment of the present invention;

DETAILED DESCRIPTION OF THE INVENTION

Figure 1:
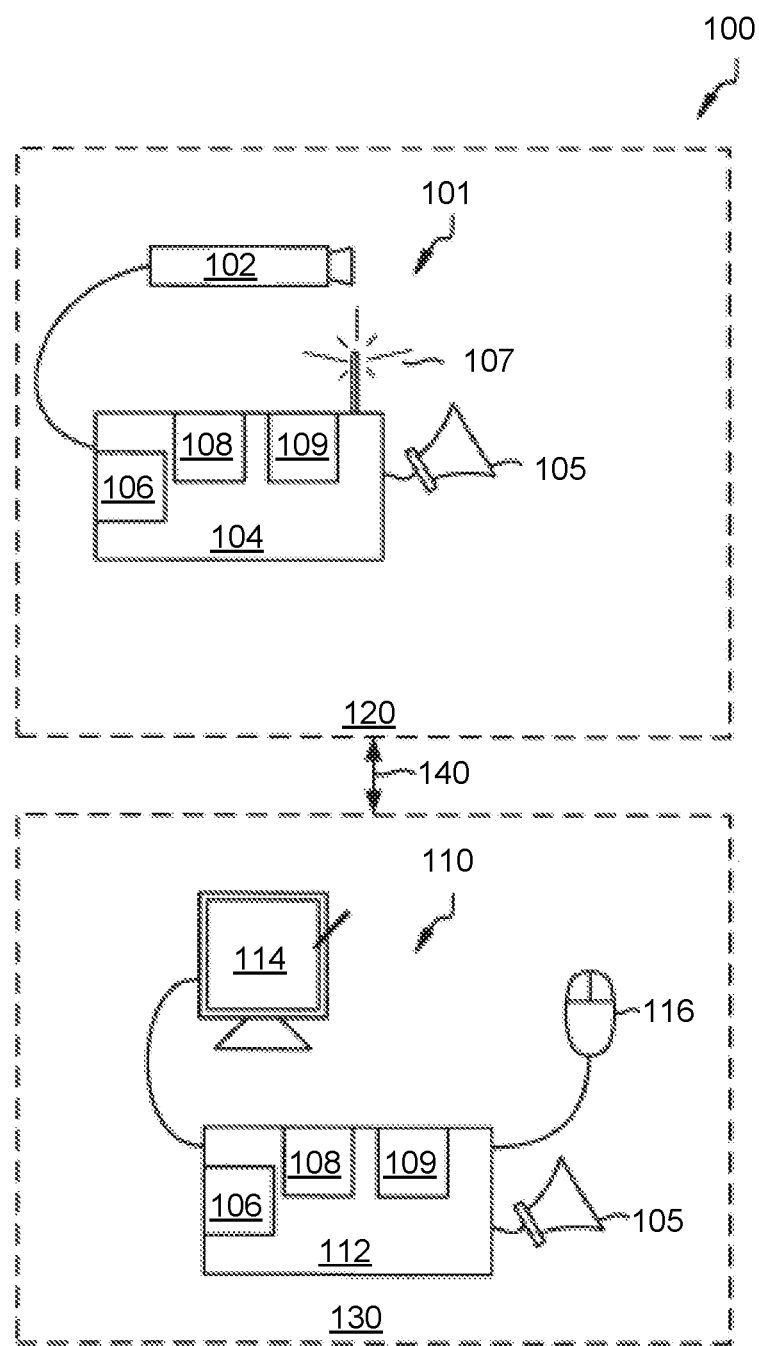
FIG. 1 illustrates a diagram of a patient fall prediction system in accordance with exemplary embodiments of the present invention.

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF), etc. Moreover, the computer readable medium may include a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java, Smalltalk, or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

FIG. 1 illustrates a diagram of a patient fall prediction system in accordance with exemplary embodiments of the present invention. As depicted in the figure, patient fall prediction system 100 includes patient monitoring device 101 and nurse monitor device 110. Patient monitoring device 101 captures video images of a portion of the patient's room 120 via camera 102, which is coupled to camera control device 104. Camera 102 may be at least of medium quality, produce a stable video output of 300 lines of resolution or greater and have infrared illumination or quasi night vision for operating in extremely low light conditions. Additionally, video camera 102 may have a relatively fast shutter speed to capture relatively fast movements without blurring at frame rates of 20 fps or above. Camera control device 104 processes the video images received from camera 102 in accordance with the novel fall prediction methodology discussed below. As such, camera control device 104 includes processor 106, memory 108 and optional video processor 109. Camera control device 104 may be a special purpose device configured specifically for patient monitoring, such as the set-top control. In either case, memory 108 includes both ROM and RAM type as necessary for storing and executing fall prediction program instructions and a high capacity memory, such as a hard drive for storing large sequences of video image frames.

Additionally, camera control device 104 may be fitted with a high capacity flash memory for temporarily storing temporal image frames during image processing and/or prior to more permanent storage on a hard drive or at a network location. Optional video processor 109 may be a dedicated image processor under the control of an application routine executing on processor 106, or may be logic operating in processor 106. Under the fall prediction routines, video processor 109 analyzes portions of sequential images for changes in a particular area which correlate to patient movements that are precursors to a fall. Patient monitoring device 101 may be coupled to nurse monitor device 110 located in nurse's station 130 via distribution network 140, for transmitting surveillance images of the patient's room and fall state information to nurse monitor device 110. Optionally, audible alarm 105 may be provided for alerting healthcare professionals that camera control device 104 has detected that the patient is at risk of falling. Additionally, camera control device 104 comprises other components as necessary, such as network controllers, a display device and display controllers, user interface, etc.

In many regards, nurse monitor device 110 may be structurally similar to camera control device 104, however its primary functions are to set up the fall prediction routines running at camera control device 104 and to monitor fall state information and surveillance video provided by patient monitoring device 101. Optimally, nurse monitor device 110 is connected to a plurality of patient monitoring devices that are located in each of the patient rooms being monitored at the nurse station. Nurse monitor device 110 includes computer 112 coupled to display 114. Computer 112 may be a personal computer, laptop, net computer, or other net appliance capable of processing the information stream. Computer 112 further comprises processor 106, memory 108 and optional video processor 109, as in camera control device 104, however these components function quite differently. In setup phase, a healthcare professional views the patient room setting and graphically defines areas of high risk for a patient fall, such as the patient bed, chair, shower, tub, toilet or doorways. The graphic object may be manipulated on display 114 by user gestures using resident touch screen capabilities or the user gestures may be entered onto a display space using mouse 116 or other type user interface through a screen pointer (not shown). Exemplary patient rooms from a viewpoint perspective of a video image are described more fully with respect to FIGS. 4A and 4B of commonly-owned U.S. Pat. No. 9,041,810, the description of which is incorporated herein by reference. That information is passed on to patient monitoring device 101 which monitors the selected area for motion predictive of a movement that is a precursor to a patient fall. When patient monitoring device 101 detects that the patient is at high risk of falling, the fall state is immediately transmitted to nurse monitor device 110, which prioritizes the information over any other routine currently running as an alarm. This is accompanied by an audible alarm signal (via audible alarm 105). The healthcare provider can then take immediate response action to prevent a patient fall.

In accordance with other exemplary embodiments of the present invention, patient monitoring device 101 may operate independently, as a self-contained, standalone device. In that case, patient monitoring device 101 should be configured with a display screen and user interface for performing setup tasks. Audible alarm 105 would not be optional. In accordance with still another exemplary embodiment, patient monitoring device 101 may comprise only video camera 102, which is coupled to nurse monitor device 110 at a remote location. In operation, camera 102 transmits a stream of images to nurse monitor device 110 for video processing for fall prediction. It should be appreciated, however, that often high volume traffic on distribution networks, such as sequences of video images, experience lag time between image capture and receipt of the images at the remote location. To avoid undesirable consequences associated with lag, the distribution network bandwidth should be sufficiently wide such that no lag time occurs, or a dedicated video path be created between nurse monitor device 110 and patient monitoring device 101. Often, neither option is practical and therefore, the video processing functionality is located proximate to video camera 102 in order to abate any undesirable lag time associated with transmitting the images to a remote location.

In addition, patient fall prediction system 100 may comprise a deactivator for temporarily disabling the patient fall prediction system under certain conditions. In the course of patient care, healthcare professionals move in and out of patient rooms and in so doing, solicit movements from the patients that might be interpreted as a movement that precedes a patient fall by the patient fall prediction system. Consequently, many false-alarms may be generated by the mere presence of a healthcare professional in the room. One means for reducing the number of false-alarms is to temporarily disarm the patient fall prediction system whenever a healthcare professional is in the room with a patient. Optimally, this is achieved through a passive detection subsystem that detects the presence of a healthcare professional in the room, using, for example, RFID or FOB technology. To that end, patient monitoring device 101 will include receiver/interrogator 107 for sensing an RFID tag or FOB transmitter. Once patient monitoring device 101 recognizes a healthcare professional is in the proximity, the patient fall prediction system is temporarily disarmed. The patient fall prediction system can automatically rearm after the healthcare professional has left the room or after a predetermined time period has elapsed. Alternatively, the patient fall prediction system may be disarmed using a manual interface, such as an IR remote (either carried by the healthcare professional or at the patient's bedside) or a dedicate deactivation button, such as at camera control device 104 or in a common location in each of the rooms. In addition to the local disarming mechanisms, the patient fall prediction system may be temporarily disarmed by a healthcare professional at care station 130 using computer 112 prior to entering the patient's room.

According to another embodiment, the patient fall prediction system may use accelerometers on RFID tags worn by patients to reduce false-alarms detected by the patient fall prediction system. A movement or event interpreted as a fall may be compared with accelerometer information that are consistent with an actual fall or a false-alarm. For example, the patient fall prediction system may indicate that the patient moved and may have fallen out of bed, but the accelerometer worn by the patient doesn't show sufficient acceleration for such an event and may then conclude that the event is a false-alarm.

In operation, patient fall prediction system 100 operates in two modes: setup mode and patient monitoring mode. A setup method implementing a patient fall prediction system for detecting patient movements is described more fully with respect to FIG. 5 of commonly-owned U.S. Pat. No. 9,041, 810, the description of which is incorporated herein by reference. Additionally, the creation of a virtual bedrail on a display in the setup mode is described more fully with respect to FIGS. 6A-6D, 7A and 7B of commonly-owned U.S. Pat. No. 9,041,810, the description of which is incorporated herein by reference.

Figure 2:
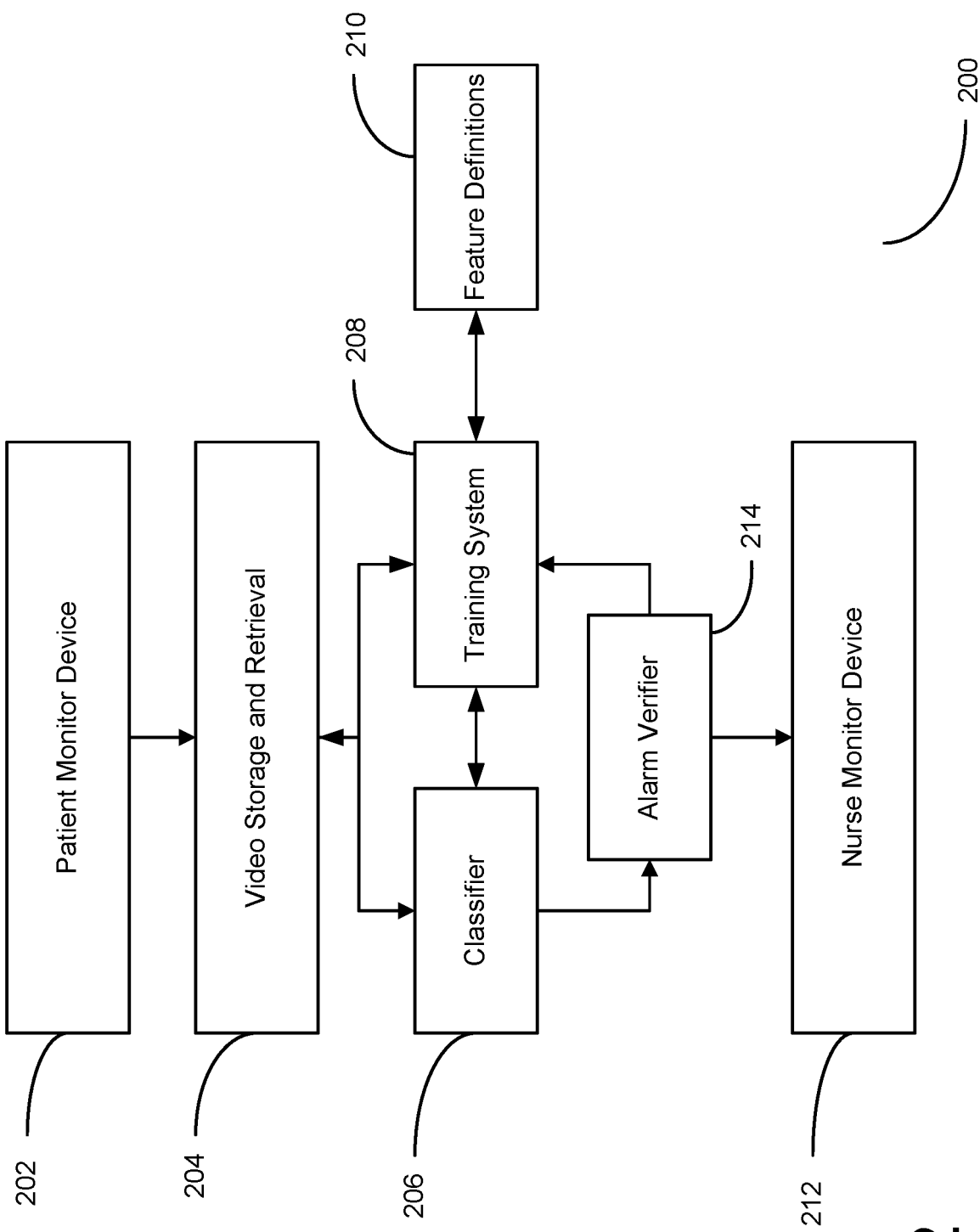
FIG. 2 illustrates a system for processing video image data received from a patient fall prediction system according to an embodiment of the present invention.

FIG. 2 illustrates a system for processing video image data received from a patient fall prediction system 100 according to an embodiment of the present invention. As the embodiment of FIG. 2 illustrates, a system 200 comprises a patient monitor device 202 and a nurse monitor device 212, as discussed supra. The system 200 further includes a video storage and retrieval device 204 for receiving video frame data from the patient monitor device 202 and storing said data. In one embodiment, video frame data may be stored permanently, or, alternatively, may be stored temporarily solely for processing. Video frame data may be stored in a number of formats and on a number of mechanisms such as flat file storage, relational database storage, or the like.

Classifier 206, training system 208, feature definition storage 210, and alarm verifier 214 are interconnected to train and operate the classifier 206, as discussed in more detail below. In one embodiment, classifier 206 and training system 208 may comprise a dedicated server, or multiple servers, utilizing multiple processors and designed to receive and process image data using techniques described herein Likewise, feature definition storage 210 may comprise a dedicated memory unit or units (e.g., RAM, hard disk, SAN, NAS, etc.).

Feature definition storage 210 may store a predefined number of features, and an associated process for extracting such features from the data stored within video storage and retrieval device 204. Exemplary features are discussed more fully with respect to FIGS. 3 through 7. The training system 208 loads features from the feature definition storage 210 and extracts and stores features from the video received from video storage and retrieval device 204. Using techniques discussed more fully herein, the training system 208 processes a plurality of frames and generates a classifier 206. The classifier 206 may be stored for subsequent usage and processing of additional video frames.

In operation, classifier 206 receives video data from video storage and retrieval device 204. As discussed with respect to FIG. 2, the classifier 206 analyzes incoming video frames and extracts features from the video frames. Using these extracted features, the classifier 206 executes a supervised learning process to classify a given frame as causing an alarm or not causing an alarm, as exemplified in FIG. 7. After classifying a given frame, the classifier 206 may then transmit the results of the classification to the nurse monitor device 212.

In one embodiment, the classifier 206 may transfer data indicating that an alarm condition should be raised at the nurse monitor device 212. The data indicating the alarm condition may be confirmed or verified by alarm verifier 214. Alarm verifier 214 may be loaded with a set of predetermined patterns of motion features associated with risk and non-risk events used to aid in improving the accuracy of the classifier 206. In particular, alarm verifier 214 can be utilized to minimize false-alarms and confirm real alarms made by the classifier 206. Features extracted from the video frames by classifier 206 may be compared with the feature patterns stored in alarm verifier 214.

Additionally, the classifier 206 may provide a feedback loop via alarm verifier 214 to the training system 208. Using this loop, the classifier 206 may continuously update the training data set used by training system 208. In alternative embodiments, the classifier 206 may only update the training data set in response to a confirmation that an alarm condition was properly raised. For example, the alarm verifier 214 (and/or nurse monitor device 212) may be configured to confirm or refute that an actual alarm condition has been properly raised. In this manner, the classifier 206 updates the predicted alarm condition based on verification data from alarm verifier 214 and supplements the training system 208 with the corrected data.

Although illustrated as separate from the nurse monitor device 212, the classifier 206, training system 208, feature definition storage 210, and the alarm verifier 214 may alternatively be located locally at the nurse monitor device 212. Further, FIG. 2 illustrates a single classifier 206, single training system 208, and single feature definition storage 210, however additional embodiments may exist wherein the system 200 utilizes multiple classifiers, training systems, and feature definition storage units in order to increase throughput and/or accuracy of the system 200.

Figure 3:
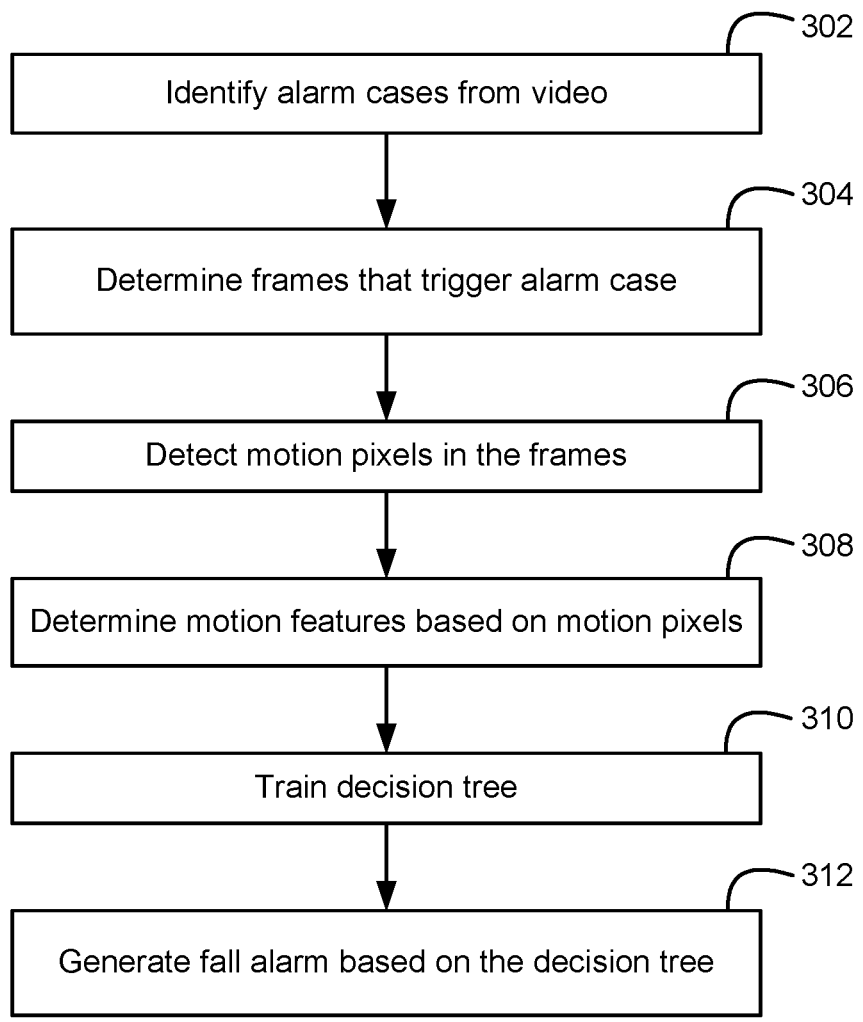
FIG. 3 illustrates a flowchart of a method for determining bed fall characteristics according to an embodiment of the present invention.

FIG. 3 presents a flowchart of a method for determining bed fall characteristics according to an embodiment of the present invention. A computing system may receive surveillance video including a plurality of video frames and a log of events or alarms associated with bed fall events. Alarm cases are identified from video, step 302. Each video can be examined and labeled as alarm or no-alarm cases. In one embodiment, the identification of alarm cases may be based upon historical data associated with the video. For example, as discussed supra a fall prediction system may be configured to capture video frames and trigger alerts based on identified motion as described in commonly-owned U.S. Pat. No. 9,041,810. Alternatively, the method 300 may utilize unsupervised clustering techniques to automatically label video. The correlation between video and alarms may be stored for further analysis, thus associated a video, including a plurality of frames, with an alarm condition. Thus, the method 300 may access a database of video data and select that video data that has been known to trigger an alarm.

After identifying a video that has triggered an alarm, the specific frames that trigger the alarm case are determined, step 304, and video frames that include alarm cases or events related to fall risks may be collected. In one embodiment, the number of videos that correspond to an alarm case may be greater than the number of videos that actually correspond to a potential fall, given the potential for false positives as discussed supra. Furthermore, a given video may have potentially triggered multiple alarms during the course of the video. In one embodiment, false positives may be further limited by requiring three consecutive alarms before signaling an alert. According to another embodiment, false positives may be reduced by corroborating the videos with accelerometer information (e.g., checking accelerometer worn by patient corresponding to the time of video frames including alarm cases or events). Thus, step 304 operates to identify, as narrowly as possible, the specific video frames corresponding to a given alarm. In one embodiment, the number of frames needed to identify the instance an alarm is triggered is three, although the number of frames required may be increased or decreased. By utilizing multiple prior frames, the method 300 may compensate for changes in lighting or other factors that contribute to a noise level for a given set of frames.

For each alarm case, the number and sequence of frames that could trigger an alarm for bed fall are identified. In an alternative embodiment, video and frames may be manually tagged and received from staff or an operator of a video surveillance system. Additionally, the method 300 may also tag those video frames that do not trigger an alarm, to further refine the supervised learning approach. By identifying frames that do not trigger an alarm, the method 300 may increase the reliability of the system versus solely tagging those frames that do cause an alarm.

For each set of frames and associated alarm cases, the method 300 detects motion pixels in the alarm triggering frames, step 306. Detecting motion may include comparing, pixel by pixel, between a current frame and at least one previous frame. In some embodiments, multiple, previous frames may be selected to reduce noise. For example, at least two previous frames $F_1$ and $F_2$ are selected to be compared with a current frame $F_3$. Each pixel of $F_1$ and $F_2$ may be selected and compared with corresponding pixels in $F_3$. Thus, in the illustrated embodiment, the method compares, pixel by pixel, the change of values of each pixel to determine when a pixel "changes," thus indicating a type of motion. Detecting motion in frames may comprise creating a binary motion image illustrated in FIG. 4.

Motion features are determined from the motion pixels, step 308. Motion features or a set of derived values relating to the motion of a virtual bed zone may be extracted. In one embodiment, a virtual bed zone may comprise a virtual zone delineated by virtual bed rails or virtual chair rails. Motion features may include a centroid, centroid area, bed motion percentage, connected components, and unconnected motion features. Each of these features is discussed in more detail below.

A first motion feature that may be detected is a "centroid" feature. In one embodiment, a centroid is the weighted average x and y coordinates of all motion pixels and can be thought of as the "center of mass" of the motion analysis. Thus if there are two areas of identical motion, the centroid feature will indicate an area between the two areas on both the x- and y-axes as the centroid, or center of mass, area. Such a motion feature indicates the primary locus of movement which may be useful in determining whether motion is near a fall risk area (e.g., the edge of a bed) or, on average, not near a fall risk area. An exemplary centroid feature is illustrated in more detail with respect to FIG. 5.

Figure 4:
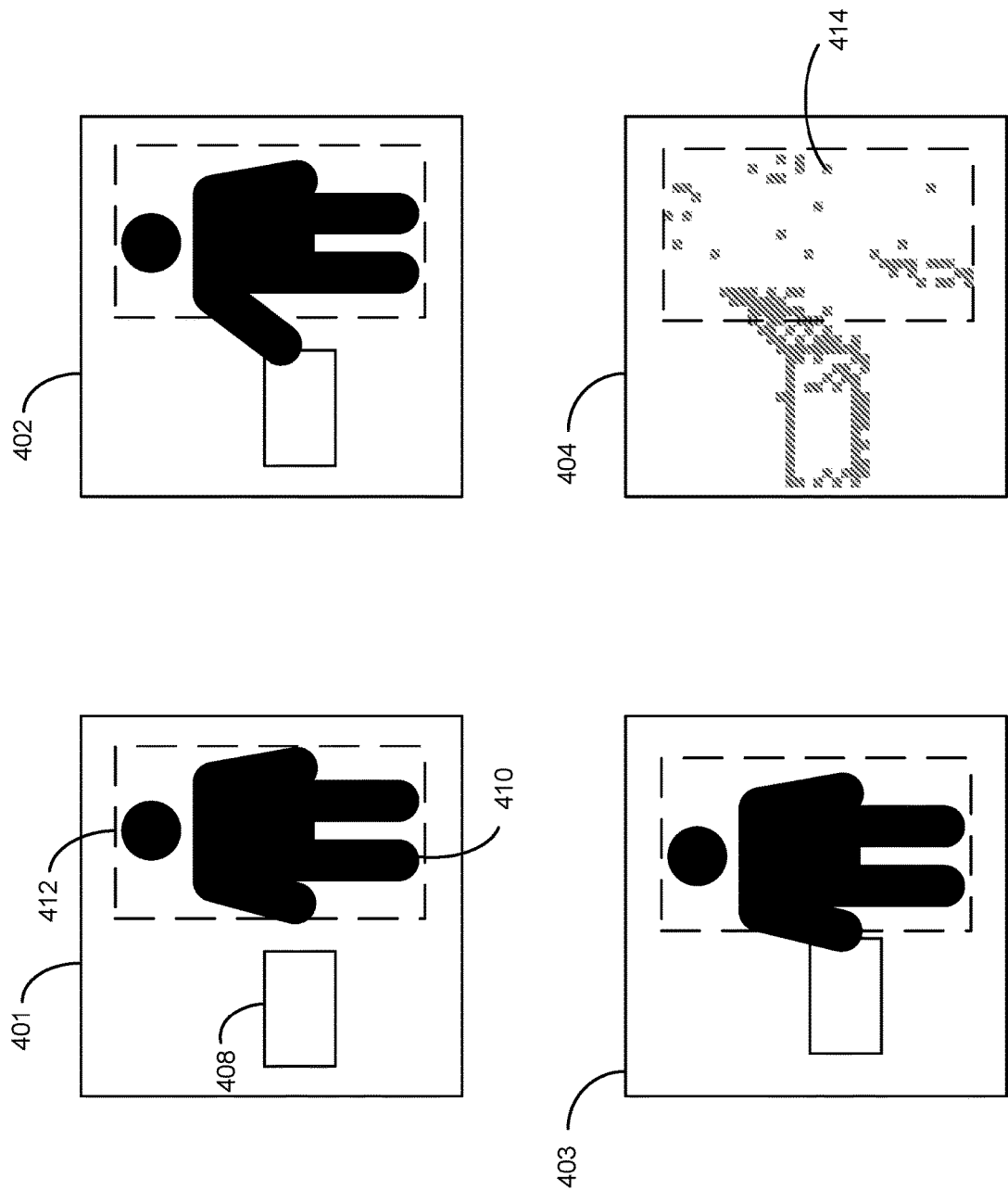
FIG. 4 illustrates an exemplary motion detection according to an embodiment of the present invention.

A second motion feature that may be detected is a "centroid area" feature. In one embodiment, the centroid area feature is the count of all motion pixels in the image. Thus, the centroid area feature represents that total movement between frames. A small centroid area feature indicates little movement, while a large centroid area feature indicates substantial movement. In one embodiment, a number of pixels in a motion image (e.g., as illustrated in FIGS. 4 and 5) may be counted.

A third motion feature that may be detected is a "bed motion percentage" feature. The bed motion percentage feature corresponds to the ratio of motion pixels within a plurality of defined virtual bed zones to the total pixel count in the same virtual bed zones. As described more fully in U.S. Pat. No. 9,041,810, a virtual bed zone may be created utilizing defined boundaries programmatically determined for a given set of image frames. In one example, a virtual bed zone may simply be a perimeter around a bed, while more involved virtual bed zones may be utilized. The bed motion percentage feature represents the amount of movement localized to the bed zone and thus indicates whether there is substantial movement with a bed zone. The bed motion percentage feature is illustrated with respect to FIG. 5.

A fourth motion feature that may be detected is a "connected components" feature. This feature corresponds to the number of "connected" pixels near a bed zone. In one embodiment, the illustrative method first "groups" pixels that are within a certain distance from each other, thus forming "connected" groups of pixels, versus individual pixels. For each of these groups of pixels, the method 300 may ignore those groups that are not within a specified distance from an identified bed zone (e.g., the edge of a bed). In one embodiment, the connected components comprise the number of remaining components. In alternative embodiments, the feature may be further refined to compute the ratio of the remaining motion outside the bed zone to all motion inside the bed zone as represented by the components.

A fifth motion feature that may be detected is an "unconnected motion" feature, a feature related to the connected motion feature. In one embodiment, this feature calculates the amount of motion in the centroid area (as discussed supra) that cannot be attributed to the motion within and near the bed zone using the connected components discussed supra.

Figure 6:
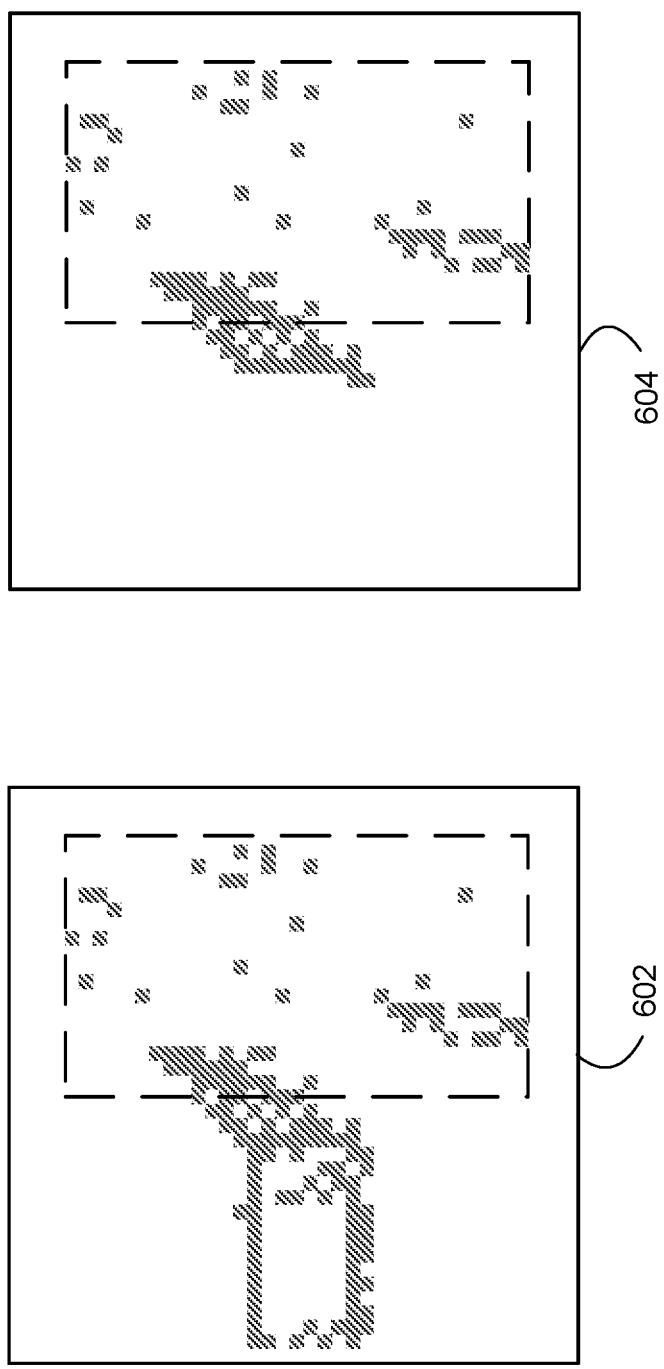
FIG. 6 illustrates an image processed using connected components according to an embodiment of the present invention.

The connected components and unconnected motion features are illustrated with respect to FIG. 6. While the present disclosure only discussed five features, in alternative embodiments, additional features may be utilized to refine the accuracy of the method 300.

Figure 7:
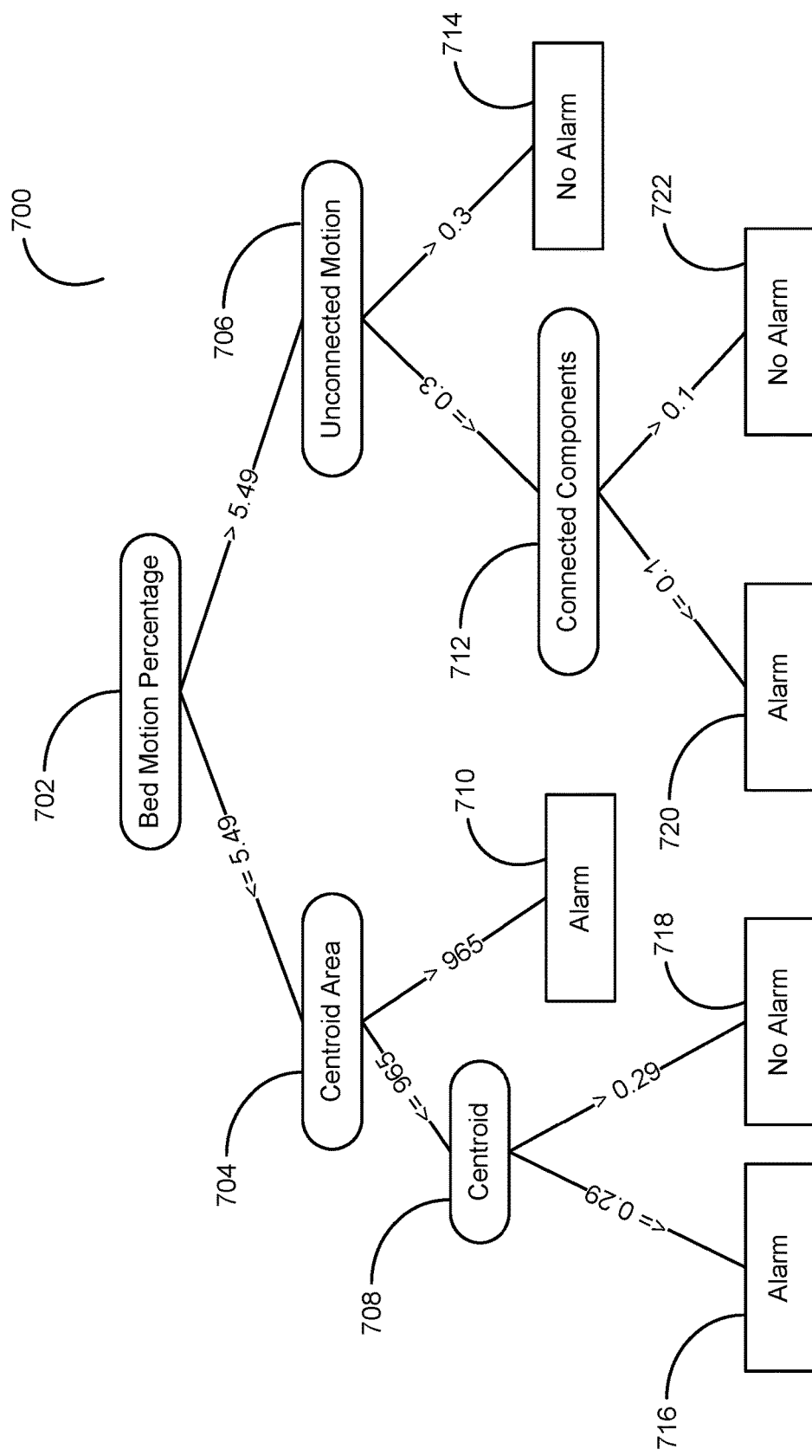
FIG. 7 illustrates an exemplary decision tree classifier trained according to one embodiment of the invention.

After identifying each of these features, a training data set may be constructed with each of the features being associated with a set of frames and a label indicating that an alarm was, or was not triggered. A classifier, such as a decision tree or similar learning machine (such as nearest neighbor, support vector machines, or neural networks), is trained based on the features, step 310. In one embodiment, the method 300 may input the training data set into a decision tree classifier to construct a decision tree utilizing the identified features. An exemplary resulting decision tree is depicted in FIG. 7.

A classifier may be chosen for training based on a training set of the features determined from the motion images and the identification of alarm cases for certain video frames. Any classifier may be selected based on its ease of training, implementation, and interpretability. In one embodiment, the method 300 may utilize ten-fold cross-validation to construct a decision tree. During testing, the use of cross-validation was shown to accurately classify unknown frames as alarm or no-alarm conditions approximately 92% of the time using the five features above. Although the method 300 discusses a single classifier, alternative embodiments existed wherein a collection of classifiers (e.g., decision trees) may be utilized to provide higher accuracy than a single classifier. For example, the method 300 may employ boosted decision trees or a random forest to maximize accuracy.

After the classifier is trained, it may be utilized in a production setting. In one embodiment, the classifier may be employed in the patient fall prediction system discussed supra. That is, the classifier may be used in place of existing techniques for analyzing image frames. In an exemplary embodiment, the fall prediction system may feed video frames into the classifier on a real-time or near real-time basis. As discussed more fully with respect to FIG. 7, the method 300 may generate a fall alarm based on the output of the classifier, step 312. The classifier may include various nodes for facilitating a fall detection system to determine whether a given unclassified frame of video should trigger an alarm associated with a fall risk event.

FIG. 4 illustrates the results of comparing, pixel-by-pixel, the movement in a frame 403 as compared to two previous frames 401 and 402. Specifically, the embodiment in FIG. 4 illustrates three frames showing a patient 410 at first stationary in a bed (frame 401) next to a table 408, reaching for a table (frame 402), and moving the table closer to the bed (frame 403). Each frame additionally includes a virtual bed zone 412 that roughly corresponds to the shape of the bed (not illustrated). Note that the embodiment of FIGS. 4 through 6 illustrate a top-down view of a patient, however alternative embodiments exist wherein a camera may be placed in other positions.

In order to create a motion image 404, as discussed, the method 300 compares frames 401 and 402 to frame 403. If the value of a pixel in a current frame 403 has changed (e.g., beyond a certain threshold) from the two previous frames 401 and 402, it may be marked as a motion pixel. This may be repeated for all of the pixels in the current frame to obtain a set of motion pixels, including representative motion pixel 414. A resulting motion image 404 (which may be a binary graph) may be constructed whose values are zero everywhere except for those pixels that differ from both prior frames by more than some threshold (this value can be chosen by optimizing the error on a resulting classifier). Accordingly, a difference in both prior frames 401 and 402, the system is able to filter some of the noise due to changes in lighting, etc. Motion pixels from the motion image may be used to engineer features for allowing a machine learning algorithm to separate alarm from no-alarm frames.

As illustrated in FIG. 4, a resultant motion image 404 illustrates areas where no motion has occurred (white) and where motion has been detected in the past two frames (shaded). Specifically, as exemplified in FIG. 4, motion is detected near the patient's right hand 406 which corresponds to the patient's movement. Further, the Figure illustrates the movement of a non-patient object 408 (i.e., table) closer to the virtual bed zone. As discussed supra, the number of light pixels in motion image 404 may counted to calculate the centroid area of a frame 403.

FIG. 5 illustrates an exemplary centroid location according to an embodiment of the present invention. Video frame 502 and motion image 504 illustrate a subject within bounding virtual bed zone. As discussed supra, motion image 504 may be constructed for frame 502 based on previous frames and illustrates the movement leading up to frame 502. Note that FIG. 5 illustrates motion pixels in motion image 504 as shaded pixels. As discussed supra, a centroid 506 may be a located by calculating a weighted average of x- and y-coordinates of all the motion pixels in motion image 504. FIG. 5 illustrates the effect of the location of motion pixels on the centroid 506 location. As illustrated in motion image 504, the sparse motion pixels associated with the patient are offset by the dense motion pixels focused around table 508. Since the centroid feature is based on the number of motion pixels and, importantly, their position, the centroid is located approximately in the center of all motion detected in the motion image 504. FIG. 5 further illustrates a virtual bed zone 510. As discussed supra, the virtual bed zone 510 may be utilized to calculate the bed motion percentage by providing a bounding area in which to count the number of motion pixels.

FIG. 6 presents an image processed using connected components according to an embodiment of the present invention. A connected components feature may be determined for motion pixel images of a plurality of frames as discussed more fully with respect to FIG. 4. Motion pixels that are connected (e.g., adjacent) may be grouped in clusters and motion pixel groups that don't have at least one pixel within some threshold distance of the virtual bed zone are pruned away from the full motion image 602 resulting in a connected components image 604 as illustrated by near/inside rails motion in FIG. 6. As illustrated, image 604 only contains those pixels within the virtual bed zone or within a specified distance from the bed zone.

The ratio of the remaining motion pixels outside the virtual bed zone to all motion pixels inside the virtual bed zone may then be computed to determine a connected components ratio. Unconnected motion may further be determined by calculating the amount of motion (pixels) in the centroid area that is unrelated to the motion within and near the virtual bed zone using the connected components above.

FIG. 7 presents an exemplary decision tree classifier 700 trained according to one embodiment of the invention. As discussed supra, the method 300 may generate a classifier such as the exemplary decision tree depicted in FIG. 7. In production, the decision tree classifier 700 receives a plurality of frames, creates a motion image, and calculates a number of features discussed more fully above. After generating the features for the plurality of frames, the method 300 may utilize a decision tree classifier such as that illustrated in FIG. 7. Notably, the decision tree classifier illustrated in FIG. 7 is exemplary only and actual decision tree classifiers utilized may differ in complexity or the features/values utilized.

As illustrated in FIG. 7, a decision tree classifier 700 first analyzes the feature to determine if the bed motion percentage feature 702 has a value above 5.49. If the value of this feature is greater than 5.49, the decision tree classifier 700 then determines if the unconnected motion feature 706 is greater than 0.3. If so, the decision tree classifier 700 indicates that the incoming video frames are associated with an alarm 714. In one embodiment, the decision tree classifier 700 may be configured to automatically trigger an alarm indicating a potential fall as discussed supra. Alternatively, if the decision tree classifier 700 determines that the unconnected motion feature 706 is below or equal to 0.3, the decision tree classifier 700 may then determine the value of the connected components feature 712. If the connected components feature 712 is above 0.1, the decision tree classifier 700 indicates that no alarm condition exists 722. Alternatively, if the connected components feature 712 is lower than or equal to 0.1, the decision tree classifier 700 raises an alarm 720.

Returning to the top of FIG. 7, the decision tree classifier 700 may alternatively determine that the bed motion percentage 702 is below or equal to 5.49. In this instance, the decision tree classifier 700 may then determine whether the centroid area 704 is greater than 965 or less than or equal to 965. If the centroid area 704 is above 965, an alarm condition may be triggered 710. If not, the decision tree classifier 700 may then analyze the centroid feature 708 to determine if the value is above 0.29 or below (or equal to) 0.29. A centroid value above 0.29 may trigger an alarm condition 718, while a value less than or equal to 0.29 may not 716.

Figure 8:
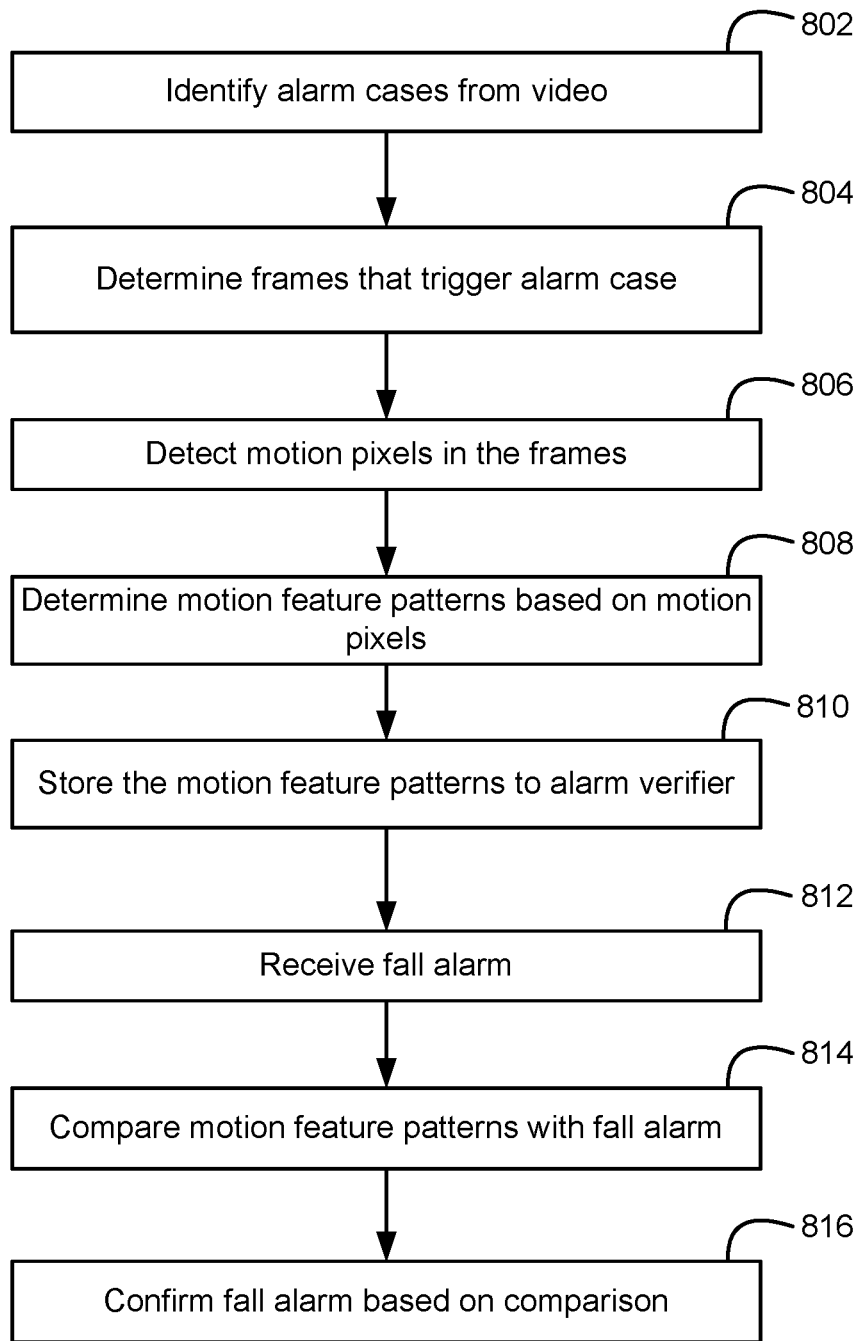
FIG. 8 illustrates a flowchart of a method for analyzing fall alarms according to an embodiment of the present invention.

FIG. 8 presents a flowchart of a method for analyzing fall alarms according to an embodiment of the present invention. The decision tree classifier may be improved to minimize false-alarms and/or confirming real alarms made by the classifier. Improvements to the decisions of the classifier may be made by generating and storing a set of predetermined patterns of motion features which have been determined to be either risk or non-risky. Examples of exceptions or false-alarms include accounting for individuals other than the patient in bed, such as, a healthcare provider walking into the room and past the bed, or back out the door, or visitors getting up off the adjacent chair, or the like. Examples of clear risks include patients rolling over near the edge of the bed, moving a left off the bed, as if to stand, etc. A pattern of motion features characterizing these examples can be identified and appropriately stored as false-alarms and real alarms for an alarm verifier. These patterns may be created by recording the pattern of motion features associated with the real alarm and false-alarm cases in a lookup table, database or similar storage.

Alarm cases from video are identified, step 802. Each video can be examined and labeled as real alarm or false-alarm cases. Video data from a database of recorded video that are known to trigger or indicate real-alarms and false-alarms, may be accessed and selected. In one embodiment, the identification of alarm cases may be based upon historical data associated with the video. Alternatively, the method may utilize unsupervised clustering techniques to automatically label video. Identifying alarm cases includes receiving a plurality of frames that include examples of real alarms and false-alarms. The plurality of frames may be identified, labeled or tagged with metadata to indicate a particular real alarm or false-alarm case. Frames that trigger an alarm case are determined, step 804. The plurality of frames can be narrowed and reduced to only frames that include relevant real alarm or false-alarm movements. Motion pixels in the frames are detected, step 806, to create motion images for the plurality of frames.

Motion features patterns are determined based on the motion pixels, step 808. Motion features relating to the motion of a virtual bed zone are determined for each real alarm or false-alarm case from the plurality of frames. A motion feature may be any one of centroids, centroid area, bed motion percentage, connected components, and unconnected motion calculations, as described above. According to an alternative embodiment, determining motion features for the plurality of frames is performed in the training of the classifier, and as such, the motion features may be saved in the training system (in such a case, steps 804 and 806 may be bypassed). Once motion features are determined, patterns of the motion features are determined for each of the real alarm or false-alarm case. The motion feature patterns may then be stored to an alarm verifier for comparison with the classifier, step 810. Particularly, each case may be associated with a pattern of one or more motion features characteristic of a given fall or non-fall event. The alarm verifier may contain a plurality of such patterns for comparison with fall alarms generated by the classifier of the patient fall detection system according to embodiments of the present invention.

A fall alarm is received from a classifier of a patient fall detection system, step 812. The fall alarm may be generated by the classifier identifying a plurality of real-time video frames that trigger a bed fall alarm from a production setting. The stored motion feature patterns are compared with the fall alarm, step 814. Fall alarms generated by the classifier can be confirmed or verified by comparing motion features of video frames corresponding to the fall alarms with the stored motion feature patterns of false-alarms and real alarms. According to other embodiments, steps 802 through 814 may be performed with respect to accelerometer information known to trigger or indicate real-alarms and false-alarms instead of or in addition to the video data.

Figure 9:
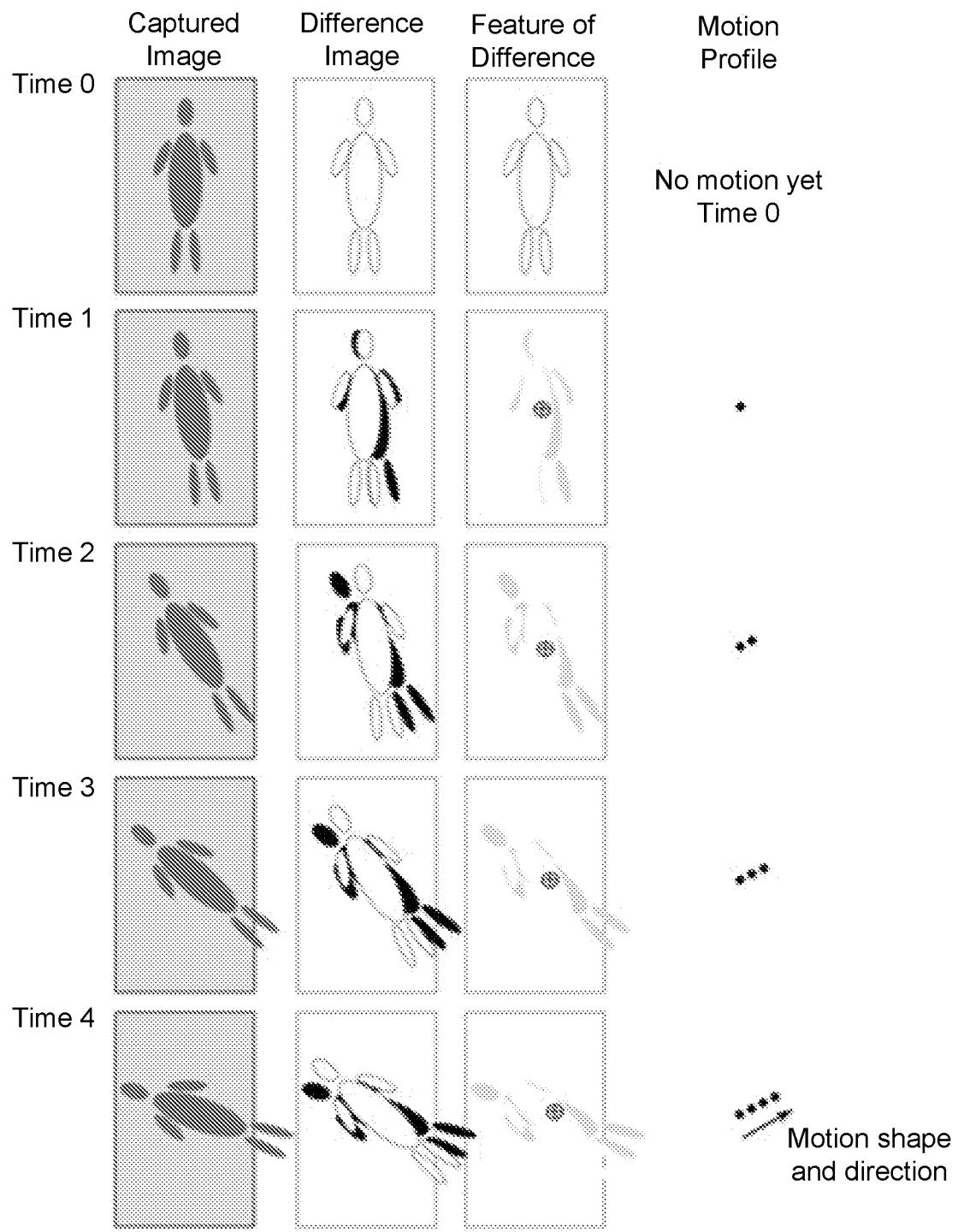
FIG. 9-10 illustrate exemplary false-alarm patterns according to an embodiment of the present invention.

FIG. 9 presents an exemplary stored false-alarm pattern. The fall alarm pattern may characterize a series of images over time (e.g., Time 0-Time 4) in a motion profile. The motion profile can be derived from a feature of difference to determine motion shape and direction from a centroid location over time. The feature of difference is determined from a captured image and a difference image. The feature of difference could be centroid of differences, geometric pattern found in difference, center of bounding box of differences or any other feature that is trackable by position.

Figure 10:
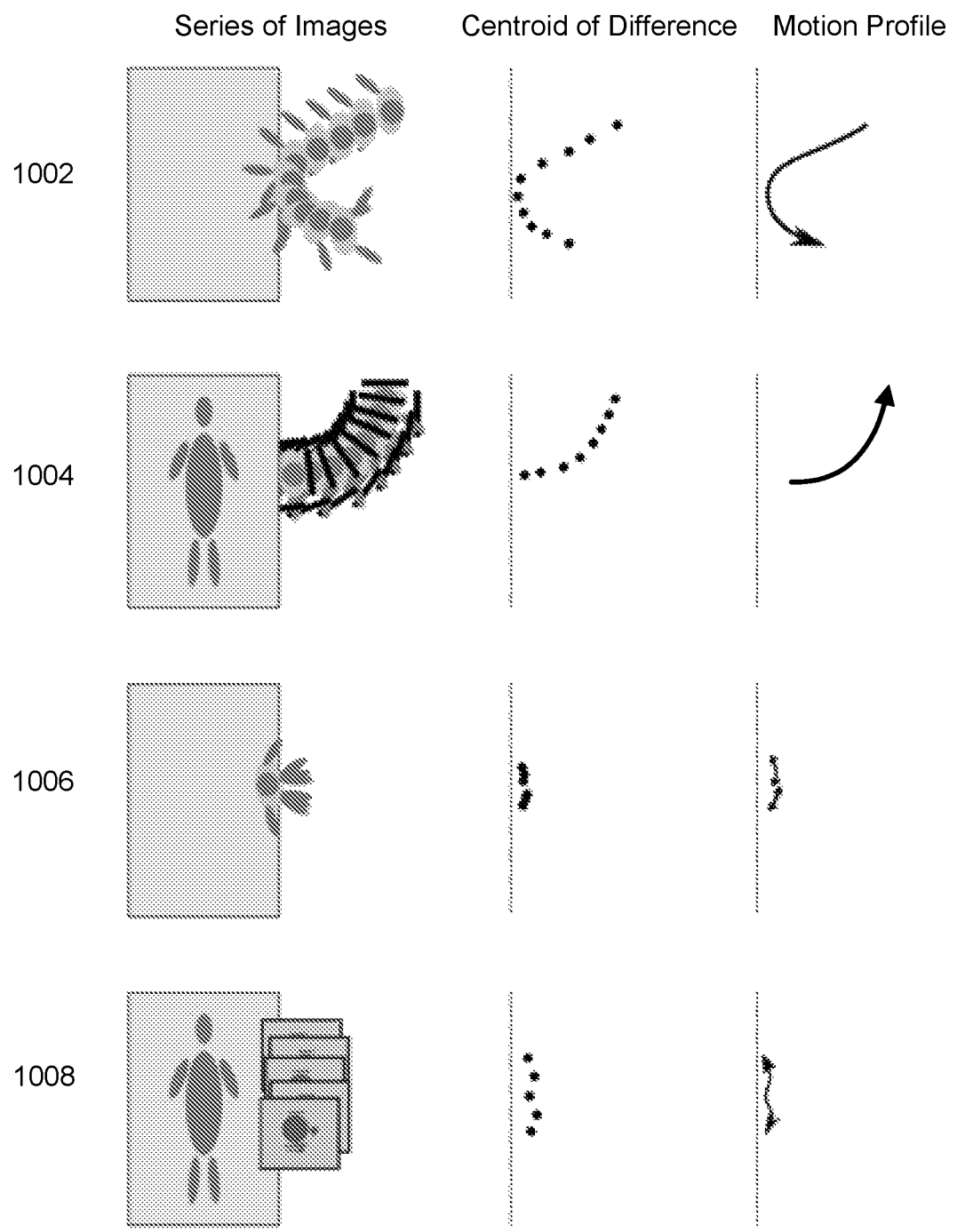

FIG. 10 presents additional exemplary stored false-alarm patterns. The illustrated patterns include a series of images, centroid of difference, and a motion profile. Pattern 1002 shows a pattern of a person (nurse or family) arriving at the bed and breaking the barrier going away from the bed. Pattern 1004 illustrates a pattern of someone sitting at the bed on top or across the rail. When they move away, it could look like someone moving off the bed (a pattern that would look like a fall) when in reality it is a chair moving back from the bed to its normal location. Pattern 1006 illustrates a pattern of a patient sitting well back on his bed with his legs across the edge. That he is swinging his legs back in forth might be an indication that he is just sitting there. Pattern 1008 illustrates a tray/table that can be moved back and forth on the rail and also in and out (notice the wavy line). This might cause a false positive because it is moving from over the bed, off the bed, however, the wavy pattern can help identify that it is a tray/table.

Comparing a fall alarm to patterns of motion features stored in the alarm verifier includes finding statistically significant similarities between the fall alarm (motion features of corresponding video frames) and the stored patterns of motion features. The comparing may further include performing similarity analysis to determine statistically significant (i.e., not random) matches with the patterns of the alarm verifier. Similarity analysis may include comparing patterns of pixels to find similarities in at least one of centroid features, centroid area, bed motion percentage, connected components, and unconnected motion calculations. The analysis may also compare distances and determine correlations between centroid locations, unconnected motion, connected components, etc. For example, the method may compare centroid distances from motion pixels of a plurality of frames corresponding to an alarm with centroid distances from motion pixels of one or more real alarm cases over a plurality of frames and verify the alarm when centroid distances are determined to match by a predetermined centroid distance threshold. Correlation between centroid locations includes statistical relationships involving dependence for finding a predictive relationship among the motion features. Additionally, regression analysis may be used to determine relationships among variables (of the motion features). Further description and details of regression analysis may be found in U.S. Patent Application Publication No. 2014/0304213, entitled "REGRESSION ANALYSIS SYSTEM AND REGRESSION ANALYSIS METHOD THAT PERFORM DISCRIMINATION AND REGRESSION SIMULTANEOUSLY" which is herein incorporated by reference in its entirety.

Referring back to FIG. 8, the fall alarm is confirmed based on the comparison, step 816. Matching of the stored patterns with the fall alarm can verify or confirm the fall alarm. Additionally, the confirmation of a fall alarm may be used as feedback into training the classifier. The confirmation information may be forwarded to the training system as a second stage machine learning, where the classifier learns preliminary concepts in the first stage and live identification results (fall alarms) of the classifier may then be used as training data in conjunction with confirmation of the fall alarms for a second stage machine learning. Second stage machine learning are described in further detail in U.S. Patent Application Publication No. 2009/0228413, entitled "LEARNING METHOD FOR SUPPORT VECTOR MACHINE" and U.S. Patent Application Publication No. 2006/0248031, entitled "METHOD FOR TRAINING A LEARNING-CAPABLE SYSTEM" which are herein incorporated by reference in their entirety.

FIGS. 1 through 8 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A surveillance system for detecting a fall risk condition, the system comprising:
   a computer system comprising memory and logic circuitry configured to:
   retrieve, from a storage device, video data that is associated with triggering false alarm cases of patient falls;
   determine motion feature patterns of the video data associated with the false alarm cases;
   store the motion feature patterns of the video data;
   analyze, using a classifier that is trained with a set of features associated with triggering alarms for patient falls, a plurality of frames generated from a surveillance camera;
   classify one or more of the plurality of frames as causing an alarm; and
   verify the alarm by extracting motion feature patterns of the one or more of the plurality of frames and comparing the extracted motion feature patterns with the stored motion feature patterns.

2. The system of claim 1 wherein the computer system is further configured to receive the plurality of frames from the surveillance camera, the plurality of frames including an area in which a patient at risk of falling is being monitored.

3. The system of claim 1 wherein the false alarm cases include motion of individuals other than a patient in bed.

4. The system of claim 1 wherein the false alarm cases include a healthcare provider walking into a room and past a bed, or out a door.

5. The system of claim 1 wherein the false alarm cases include visitors getting up off a chair that is adjacent to a bed.

6. The system of claim 1 wherein the false alarm cases include an individual sitting on a chair that appears on top or across a rail of a bed.

7. The system of claim 1 wherein the false alarm cases include a patient sitting on a bed with the patient's legs across an edge of the bed.

8. The system of claim 1 wherein the false alarm cases include a tray table moving back and forth on a rail of a bed.

9. The system of claim 1 wherein the computer system is further configured to:
   retrieve, from the storage device, video data that is associated with triggering real alarm cases of patient falls;
   determine motion feature patterns of the video data associated with the real alarm cases; and
   store the motion feature patterns of the video data associated with the real alarm cases.

10. The system of claim 9 wherein the real alarm cases include patients rolling over near an edge of a bed or moving off the bed.

11. The system of claim 1 wherein the computer system is further configured to update the classifier based on the verification of the alarm.

12. The system of claim 1 wherein the computer system is further configured to retrieve the video data based on historical data associated with the video data.

13. The system of claim 1 wherein the computer system is further configured to label frames in the video data to indicate the false alarm cases.

14. The system of claim 13 wherein the computer system executes unsupervised clustering techniques to label the frames in the video data.

15. The system of claim 1 wherein the computer system is further configured to verify the alarm based on accelerometer information worn by a patient corresponding to the plurality of frames.

16. The system of claim 1 wherein the computer system is further configured to classify consecutive frames from the plurality of frames as causing the alarm.

17. A method for detecting a fall risk condition, the method comprising:
- retrieving, from a storage device, video data that is associated with triggering false alarm cases of patient falls;
- determining motion feature patterns of the video data associated with the false alarm cases;
- storing the motion feature patterns of the video data;
- analyzing, using a classifier that is trained with a set of features associated with triggering alarms for patient falls, a plurality of frames generated from a surveillance camera;
- classifying one or more of the plurality of frames as causing an alarm; and
- verifying the alarm by extracting motion feature patterns of the one or more of the plurality of frames and comparing the extracted motion feature patterns with the stored motion feature patterns.

18. A system for detecting a fall risk condition, the system comprising:
- a computer system comprising memory and logic circuitry configured to:
  - retrieve, from a storage device, video data that is associated with triggering false alarm cases of patient falls;
  - determine motion feature patterns of the video data associated with the false alarm cases; and
  - store the motion feature patterns of the video data in a database stored on a memory unit accessible to one or more classifier servers over a network, the one or more classifier servers verify one or more of a plurality of frames generated from a surveillance camera as causing an alarm based on the stored motion feature patterns.

19. The system of claim 18 wherein the computer system is further configured to label frames in the video data to indicate the false alarm cases.

20. The system of claim 18 wherein the computer system is further configured to:
- retrieve, from the storage device, video data that is associated with triggering real alarm cases of patient falls;
- determine motion feature patterns of the video data associated with the real alarm cases; and
- store the motion feature patterns of the video data associated with the real alarm cases in the database.

* * * * *